:ti:l:ed:St:tes Patent

(12) United States Patent
Chao et al.

(10) Patent No.: US 10,958,928 B2
(45) Date of Patent: Mar. 23, 2021

(54) DECODER-SIDE MOTION VECTOR DERIVATION FOR VIDEO CODING

(71) Applicant: QUALCOMM Incorporated, San Diego, CA (US)

(72) Inventors: Yung-Hsuan Chao, San Diego, CA (US); Yu-Chen Sun, Bellevue, WA (US); Wei-Jung Chien, San Diego, CA (US); Yi-Wen Chen, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/379,560

(22) Filed: Apr. 9, 2019

(65) Prior Publication Data

US 2019/0313115 A1   Oct. 10, 2019

Related U.S. Application Data

(60) Provisional application No. 62/655,718, filed on Apr. 10, 2018.

(51) Int. Cl.
*H04N 19/513* (2014.01)
*H04N 19/70* (2014.01)
*H04N 19/176* (2014.01)
*H04N 19/44* (2014.01)

(52) U.S. Cl.
CPC ......... *H04N 19/513* (2014.11); *H04N 19/176* (2014.11); *H04N 19/44* (2014.11); *H04N 19/70* (2014.11)

(58) Field of Classification Search
CPC .......................... H04N 19/513; H04N 19/176
See application file for complete search history.

(56) References Cited

U.S. PATENT DOCUMENTS

| 9,247,265 | B2 * | 1/2016 | Chong | H04N 19/85 |
| 9,438,912 | B2 * | 9/2016 | Matsumura | H04N 19/82 |
| 9,819,965 | B2 * | 11/2017 | Puri | H04N 19/122 |
| 10,200,711 | B2 * | 2/2019 | Li | H04N 19/44 |
| 10,271,065 | B2 * | 4/2019 | Murakami | H04N 19/46 |
| 10,375,413 | B2 * | 8/2019 | Li | H04N 19/52 |
| 10,491,917 | B2 * | 11/2019 | Chen | H04N 19/159 |

(Continued)

OTHER PUBLICATIONS

Bross B., et al., "Versatile Video Coding (Draft 4)", Joint Video Experts Team (JVET) of ITU-T SG 16 WP 3 and ISO/IEC JTC 1/SC 29/WG 11, JVET-M1001-v3, 13th Meeting: Marrakech, MA, Jan. 9-18, 2019, 254 pages.

(Continued)

*Primary Examiner* — Irfan Habib
(74) *Attorney, Agent, or Firm* — Shumaker & Sieffert, P.A.

(57) ABSTRACT

A method of decoding video data comprising performing a prediction process for one or more neighboring blocks of video data that are neighboring a current block of video data to obtain prediction pixel values for neighboring pixels of the current block of video data, deriving a template for the current block of video data using the prediction pixel values, performing a decoder-side motion vector derivation technique using the derived template to derive a motion vector for the current block of video data, and decoding the current block of video data using the derived motion vector.

26 Claims, 12 Drawing Sheets

(56) References Cited

U.S. PATENT DOCUMENTS

| | | | | |
|---|---|---|---|---|
| 10,785,503 | B2* | 9/2020 | Jeong | H04N 19/126 |
| 2007/0177674 | A1* | 8/2007 | Yang | H04N 19/174 |
| | | | | 375/240.25 |
| 2011/0002389 | A1* | 1/2011 | Xu | H04N 19/573 |
| | | | | 375/240.16 |
| 2013/0208794 | A1* | 8/2013 | Jeong | H04N 19/186 |
| | | | | 375/240.13 |
| 2013/0208795 | A1* | 8/2013 | Xu | H04N 19/176 |
| | | | | 375/240.16 |
| 2016/0286230 | A1* | 9/2016 | Li | H04N 19/513 |
| 2017/0310994 | A1* | 10/2017 | Seo | H04N 19/105 |
| 2018/0098087 | A1* | 4/2018 | Li | H04N 19/82 |
| 2018/0192071 | A1* | 7/2018 | Chuang | H04N 19/517 |
| 2018/0220130 | A1* | 8/2018 | Zhang | H04N 19/159 |
| 2018/0249172 | A1* | 8/2018 | Chen | H04N 19/577 |
| 2019/0124350 | A1* | 4/2019 | Thirumalai | H04N 19/70 |
| 2019/0222848 | A1* | 7/2019 | Chen | H04N 19/513 |

OTHER PUBLICATIONS

Chen J., et al., "Algorithm Description of Joint Exploration Test Model 5 (JEM 5)," Joint Video Exploration Team (JVET) of ITU-T SG 16 WP 3 and ISO/IEC JTC 1/SC 29/WG 11, 5th Meeting: Geneva, Jan. 12-20, 2017, JVET-E1001-v2, 44 Pages.

Chen J., et al., JVET-G1001-V1 "Algorithm Description of Joint Exploration Test Model 7 (JEM7)", Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7-p. 23, Paragraph 2.3.7.6, p. 17, Paragraph 23.5-p. 18, section 2.

Ergen S., "ZigBee/IEEE 802.15.4 Summary", Sep. 10, 2004, 37 pp.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
International Search Report and Written Opinion—PCT/US2019/026766—ISA/EPO—dated Jun. 3, 2019.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.
Kamp S., et al., "Decoder-side motion vector derivation for hybrid video inter coding", IEEE International Conference on Multimedia and Expo (ICME), Jul. 19-23, 2010 Suntec City, Singapore, Jul. 19, 2010 (Jul. 19, 2010), Jul. 23, 2010 (Jul. 23, 2010), pp. 1277-1280, XP002613773, 2010 IEEE International Conference on Multimedia and Expo (ICME) IEEE Piscataway, NJ, USA DOI: 10.1109/ICME.2010.5583097 ISBN: 978-1-4244-7491-2.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI: 10.1109/TCSVT.2012.2221191.
Bossen et al., "JEM Software Manual," Joint Collaborative Team on Video Coding (JCT-VC), JCTVC-Software Manual, Aug. 3, 2016, 29 pp.
Wang et al., "High Efficiency Video Coding (HEVC) Defect Report," Joint Collaborative Team on Video Coding (JCT-VC), JCTVC-N1003_v1, Aug. 2013, 311 pp.

* cited by examiner

DECODER-SIDE MOTION VECTOR DERIVATION FOR VIDEO CODING

This application claims the benefit of U.S. Provisional Application No. 62/655,718, filed Apr. 10, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for decoder-side motion vector derivation. In some examples, this disclosure describes techniques of deriving a template for decoder-side motion vector derivation using prediction pixel values for neighboring blocks, rather than using reconstructed neighboring pixel values. Because the derivation of the template does not use residual information, the complexity of decoding implementations may be reduced.

In one example, this disclosure describes a method of decoding video data, the method comprising performing a prediction process for one or more neighboring blocks of video data that are neighboring a current block of video data to obtain prediction pixel values for neighboring pixels of the current block of video data, deriving a template for the current block of video data using the prediction pixel values, performing a decoder-side motion vector derivation technique using the derived template to derive a motion vector for the current block of video data, and decoding the current block of video data using the derived motion vector.

In another example, this disclosure describes an apparatus configured to decode video data, the apparatus comprising a memory configured to store video data, and one or more processors in communication with the memory, the one or more processors configured to perform a prediction process for one or more neighboring blocks of video data that are neighboring a current block of video data to obtain prediction pixel values for neighboring pixels of the current block of video data, derive a template for the current block of video data using the prediction pixel values, perform a decoder-side motion vector derivation technique using the derived template to derive a motion vector for the current block of video data, and decode the current block of video data using the derived motion vector.

In another example, this disclosure describes an apparatus configured to decode video data, the apparatus comprising means for performing a prediction process for one or more neighboring blocks of video data that are neighboring a current block of video data to obtain prediction pixel values for neighboring pixels of the current block of video data, means for deriving a template for the current block of video data using the prediction pixel values, means for performing a decoder-side motion vector derivation technique using the derived template to derive a motion vector for the current block of video data, and means for decoding the current block of video data using the derived motion vector.

In another example, this disclosure describes a non-transitory computer-readable storage medium storing instructions that, when executed, cause one or more processors to perform a prediction process for one or more neighboring blocks of video data that are neighboring a current block of video data to obtain prediction pixel values for neighboring pixels of the current block of video data, derive a template for the current block of video data using the prediction pixel values, perform a decoder-side motion vector derivation technique using the derived template to derive a motion vector for the current block of video data, and decode the current block of video data using the derived motion vector.

The details of one or more examples are set forth in the accompanying drawings and the description below. Other features, objects, and advantages will be apparent from the description, drawings, and claims.

DETAILED DESCRIPTION

This disclosure is related to decoder-side motion vector derivation (DMVD). The decoder-side motion vector derivation techniques described in this disclosure may be used in conjunction with any of the existing video codecs, such as HEVC (High Efficiency Video Coding), or may be used as coding techniques for any future video coding standards, such H.266 Versatile Video Coding (VVC).

Figure 1:
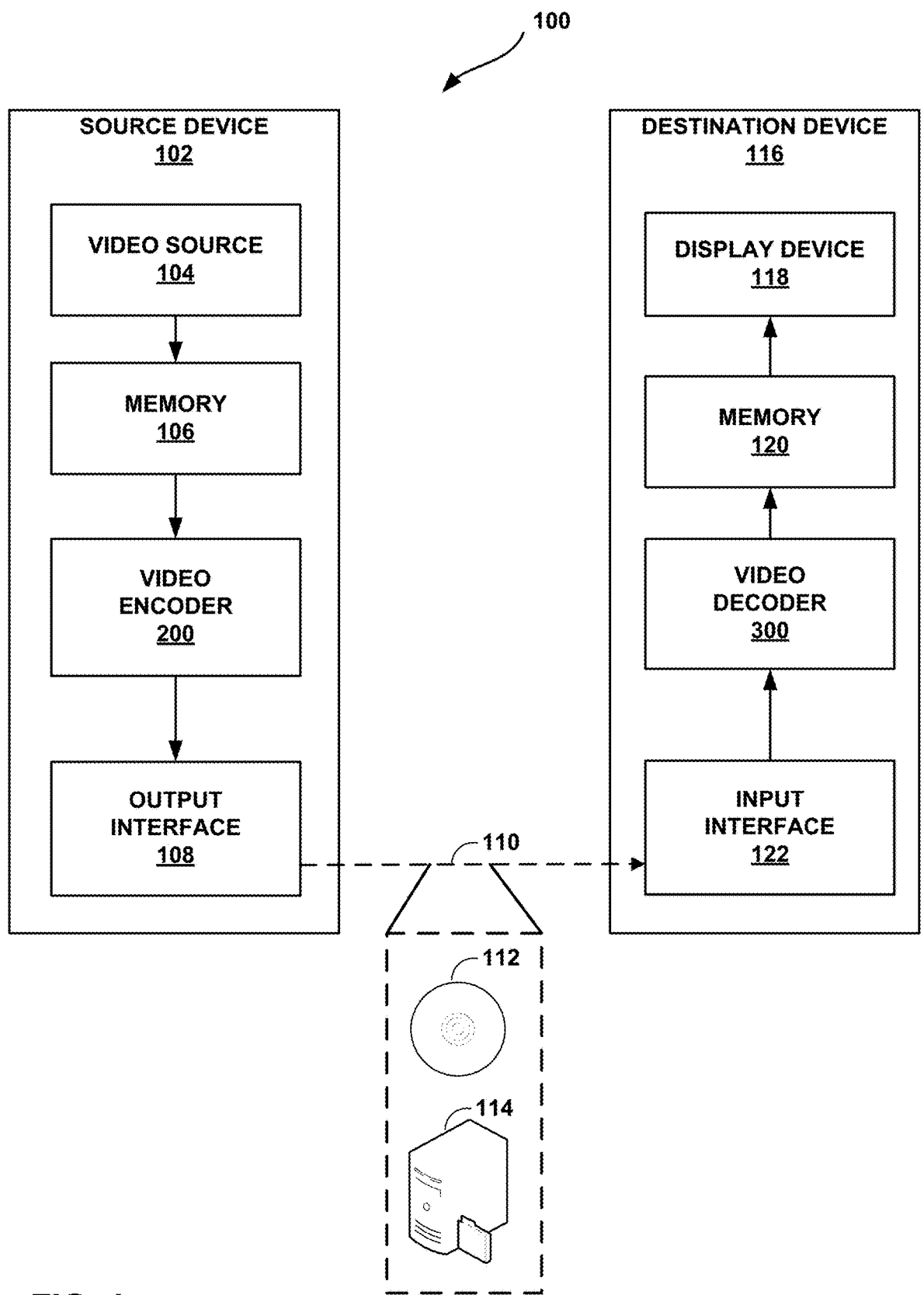
FIG. 1 is a block diagram illustrating an example video encoding and decoding system that may perform the techniques of this disclosure.

FIG. 1 is a block diagram illustrating an example video encoding and decoding system 100 that may perform the decoder-side motion vector derivation techniques of this disclosure. The techniques of this disclosure are generally directed to coding (encoding and/or decoding) video data, and in particular, are related to techniques for DMVD. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for decoder-side motion vector derivation. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for decoder-side motion vector derivation. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.23 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video coding standards include ITU-T H.61, ISO/IEC MPEG-1 Visual, ITU-T H.62 or ISO/IEC MPEG-2 Visual, ITU-T H.63, ISO/IEC MPEG-4 Visual and ITU-T H.64 (also known as ISO/IEC MPEG-4 AVC), including its Scalable Video Coding (SVC) and Multi-view Video Coding (MVC) extensions.

A video coding standard, namely High Efficiency Video Coding (HEVC) or ITU-T H.65, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

ITU-T VCEG (Q6/16) and ISO/IEC MPEG (JTC 1/SC 29/WG 11) are now studying the potential need for standardization of future video coding technology with a compression capability that exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 7 (JEM 7) could be downloaded from: https://jvet.hhi.fraunhofer.de/svn/svn_HMJEMSoftware/tags/HM-16.6-JEM-57.0/ An Algorithm description of Joint Exploration Test Model 7 (JEM7) could be referred to JVET-G1001.

Video encoder 200 and video decoder 300 may operate according to a video coding standard, such as ITU-T H.65, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.66, also referred to as Versatile Video Coding (VVC). A recent draft of the VVC standard is described in Bross, et al. "Versatile Video Coding (Draft 3)," Joint Video Experts Team (JVET) of ITU-T SG 16 WP 3 and ISO/IEC JTC 1/SC 29/WG 11, 13th Meeting: Marrakech, Mass., 9-18 Jan. 20190, JVET-M1001-v3 (hereinafter "VVC Draft 4). The techniques of this disclosure, however, are not limited to any particular coding standard.

As will be explained in more detail below, video decoder 300 may be configured to perform one or more techniques of this disclosure. For example, video decoder 300 may be configured to perform a prediction process for one or more neighboring blocks of video data that are neighboring a current block of video data to obtain prediction pixel values for neighboring pixels of the current block of video data, derive a template for the current block of video data using the prediction pixel values, perform a decoder-side motion vector derivation technique using the derived template to derive a motion vector for the current block of video data, and decode the current block of video data using the derived motion vector.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
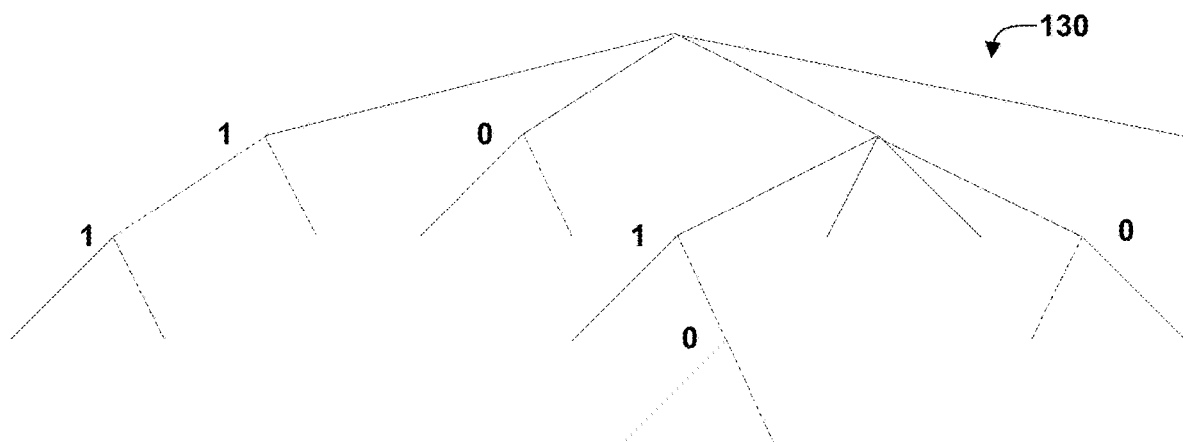
FIGS. 2A and 2B are conceptual diagrams illustrating an example quadtree binary tree (QTBT) structure, and a corresponding coding tree unit (CTU).
Figure 2B:
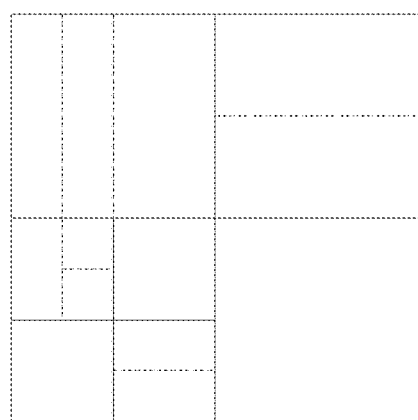

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

In the next section, HEVC and JEM techniques related to this disclosure are reviewed in more detail. The CU structure and motion vector prediction in HEVC is discussed first.

In HEVC, the largest coding unit in a slice is called a coding tree block (CTB) or coding tree unit (CTU). A CTB contains a quad-tree, the nodes of which are coding units (CUs).

The size of a CTB can range from 16×16 to 64×64 in the HEVC main profile (although technically 8×8 CTB sizes can be supported). A CU may be the same size as a CTB to as small as 8×8. Each CU is coded with one coding mode, e.g., inter or intra. When a CU is inter coded, the CU may be further partitioned into 2 or 4 prediction units (PUs) or become just one PU when further partitioning does not apply. When two PUs are present in one CU, the two PUs can be half size rectangles or two rectangles with sizes of ¼ or ¾ the size of the CU.

When a CU is inter coded, each PU has one set of motion information, which is derived with a unique inter prediction mode. In the HEVC standard, there are two inter prediction modes, named merge (skip is considered as a special case of merge) and advanced motion vector prediction (AMVP) modes, respectively, for a prediction unit (PU).

In either AMVP or merge mode, video encoder 200 and video decoder 300 may be configured to maintain a motion vector (MV) candidate list for multiple motion vector predictors. Video encoder 200 and video decoder 300 may be configured to generate the motion vector(s), as well as reference indices in the merge mode, of the current PU by taking one candidate from the MV candidate list.

In HEVC, the MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, video encoder 200 and video decoder 300 may be configured to determine the reference pictures used for the prediction of the current blocks, as well as the associated motion vectors. On the other hand, under AMVP mode for each potential prediction direction from either list 0 or list 1, a reference index is explicitly signaled, together with an MV predictor (MVP) index to the MV candidate list since the AMVP candidate contains only a motion vector. In AMVP mode, the predicted motion vectors can be further refined. The candidates for both modes are derived similarly from the same spatial and temporal neighboring blocks.

Spatial MV candidates are derived from the neighboring blocks (shown in FIG. 3A and FIG. 3B) for a specific PU (PUo), although the methods for generating the candidates from the blocks differ for merge and AMVP modes.

Figure 3A:
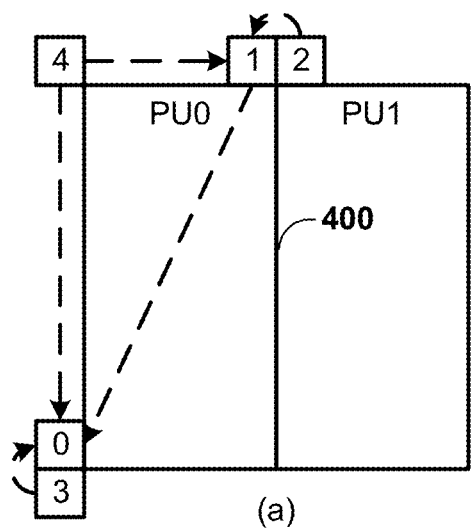
FIG. 3A is a conceptual diagram illustrating spatial motion vector candidates for a merge mode.

In merge mode, up to four spatial MV candidates can be derived for block 400 (PUO) with the order shown in FIG. 3A. The order is the following: left (0, A1), above (1, B1), above right (2, B0), below left (3, A0), and above left (4, B2).

Figure 3B:
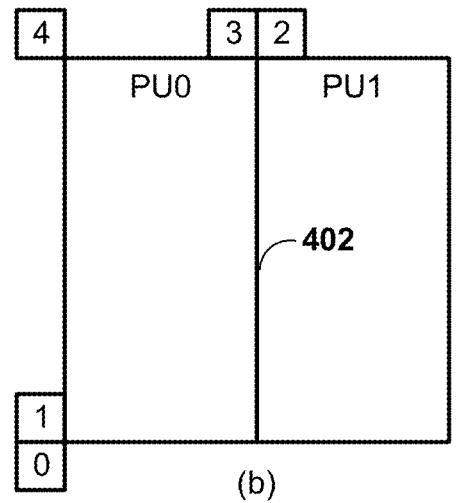
FIG. 3B is a conceptual diagram illustrating spatial motion vector candidates for an advanced motion vector prediction (AMVP) mode.

In AVMP mode, the neighboring blocks of block 402 (PUO) are divided into two groups: a left group including block 0 and 1, and an above group including blocks 2, 3, and 4, as shown in FIG. 3B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Temporal motion vector prediction in HEVC will now be discussed. Video encoder 200 and video decoder 300 may be configured to add a temporal motion vector predictor (TMVP) candidate, if enabled and available, into the MV candidate list after spatial motion vector candidates. The process of motion vector derivation for TMVP candidate is the same for both merge and AMVP modes. However, in HEVC, the target reference index for the TMVP candidate in the merge mode is set to 0.

Figure 4A:
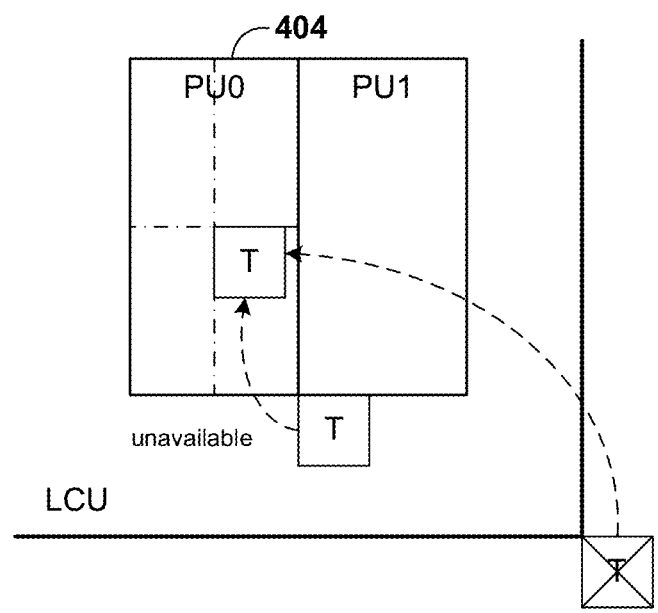
FIG. 4A is a conceptual diagram illustrating temporal motion vector candidates.
Figure 4B:
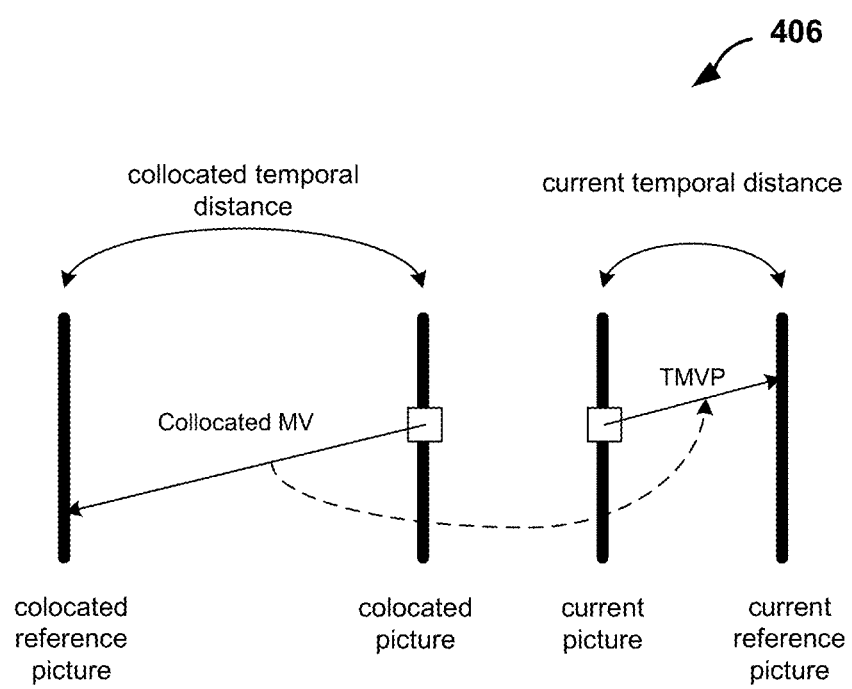
FIG. 4B is a conceptual diagram illustrating motion vector scaling.

FIG. 4A shows example TMVP candidates for block 404 (PUO) and FIG. 4B shows motion vector scaling process 406. The primary block location for TMVP candidate derivation is the bottom right block outside of the collocated PU. This candidate is shown in FIG. 4A as a block "T." The location of block T is used to compensate the bias to the above and left blocks used to generate spatial neighboring candidates. However, if that block is located outside of the current CTB row or motion information is not available, the block is substituted with a center block of the PU.

A motion vector for the TMVP candidate is derived from the co-located PU of the co-located picture, indicated in the slice level. The motion vector for the co-located PU is called a collocated MV. Similar to temporal direct mode in AVC, to derive the TMVP candidate motion vector, the co-located MV may be scaled to compensate the temporal distance differences, as shown in FIG. 4B.

Other aspects of motion prediction in HEVC will now be discussed. Several aspects of merge and AMVP modes are worth mentioning, as follows.

Motion vector scaling: It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated and the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list is not complete (e.g., less than some predetermined number of candidates), artificial motion vector candidates are generated and inserted at the end of the list until the list has the designated number of candidates.

In merge mode, there are two types of artificial MV candidates: combined candidate derived only for B-slices and zero motion vector candidates used for AMVP if the first type doesn't provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Pruning process for candidate insertion: Candidates from different blocks may happen to be the same, which decreases the efficiency of a merge/AMVP candidate list. A pruning process is applied to solve this problem. The pruning process compares one candidate against the others in the current candidate list to avoid inserting identical candidate in certain extent. To reduce the complexity, only limited numbers of pruning processes are applied instead of comparing each potential candidate with all the other existing candidates.

Decoder-side Motion Vector Derivation (DMVD) in JEM will now be discussed. In examples of the JEM reference software, there are several inter coding tools which derive or refine the motion vector (MV) for current block at the decoder side (e.g., at video decoder). Below is a description of the decoder side MV derivation (DMVD) approaches related to this disclosure.

Pattern matched motion vector derivation (PMMVD) mode is a special merge mode based on Frame-Rate Up Conversion (FRUC) techniques. With this mode, motion information of a block is not signaled, but derived at decoder side. This technology was included in JEM.

Video encoder 200 may be configured to signal a FRUC flag for a CU when its merge flag is true. When the FRUC flag is false, video encoder 200 may be configured to signal a merge index and the regular merge mode is used. When the FRUC flag is true, video encoder 200 may be configured to signal an additional FRUC mode flag to indicate which DMVD method (e.g., bilateral matching or template matching) is to be used by video decoder 300 to derive motion information for the block.

During the motion derivation process, video decoder 300 first derives an initial motion vector for the whole CU based on bilateral matching or template matching. First, video decoder 300 checks the merge list of the CU (called PMMVD seeds) and the candidate which leads to the minimum matching cost is selected as the starting point. Then, video decoder 300 performs a local search based on bilateral matching or template matching around the starting point and the MV that results in the minimum matching cost is taken as the MV for the whole CU. Subsequently, video decoder 300 may further refines the motion information at the sub-block level with the derived CU motion vectors as the starting points.

Figure 5:
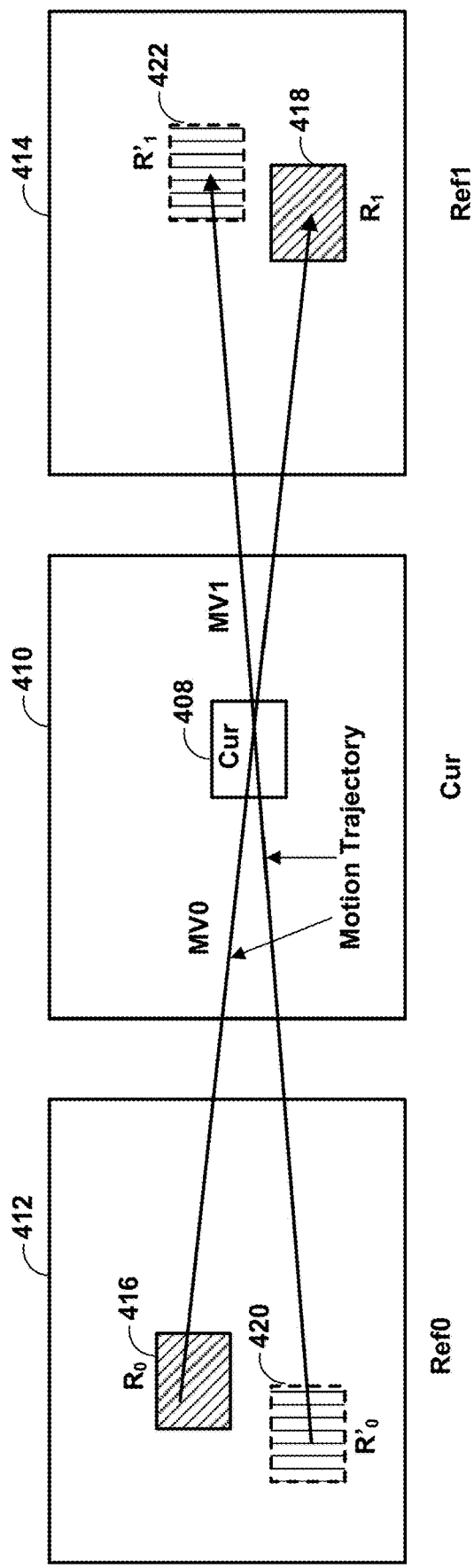
FIG. 5 is a conceptual diagram illustrating frame rate up conversion bilateral matching techniques.

As shown in FIG. 5, video decoder 300 uses bilateral matching to derive motion information of the current block 408 in picture 410 by finding the best match between two reference blocks along the motion trajectory of the current block in two different reference pictures (e.g., reference pictures 412 (Ref0) and 414 (Ref1)). In FIG. 5, video decoder 300 finds reference block 416 ($R_0$) and reference block 418 ($R_1$) as best matches along motion vector MV0. Likewise, video decoder 300 finds reference block 420 ($R'_0$) and reference block 422 ($R'_1$) as best matches along motion vector MV1. Under the assumption of continuous motion trajectory, the motion vectors MV0 and MV1 pointing to the two reference blocks shall be proportional to the temporal distances between the current picture and the two reference pictures. As a special case, when the current picture is temporally between the two reference pictures and the temporal distance from the current picture to the two reference pictures is the same, the bilateral matching becomes mirror based bi-directional MV.

Figure 6:
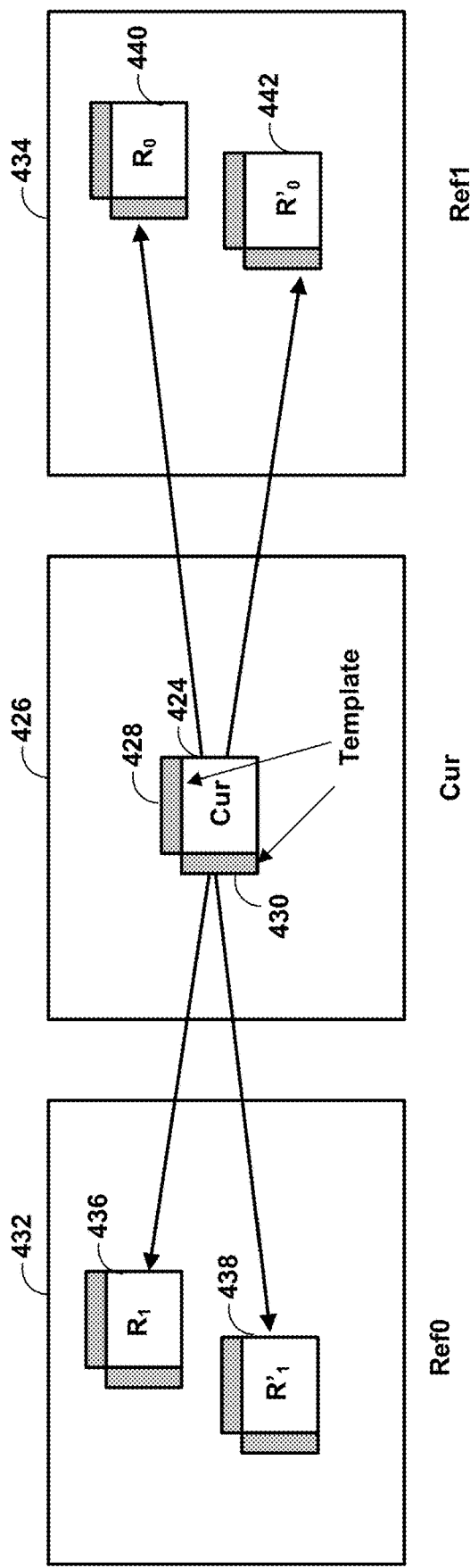
FIG. 6 is a conceptual diagram illustrating frame rate up conversion template matching techniques.

As shown in FIG. 6, template matching is used to derive motion information of the current block 424 in picture 426 by finding the best match between a template (top neighboring blocks 428 and/or left neighboring blocks 430 of current block 424) in current picture 426 and a block (same size to the template) in a reference picture (e.g., reference picture 432 (Ref0) or 434 (Ref2)). In FIG. 6, reference blocks that are possibilities as the best match are shows as reference block 436 ($R_1$), reference block 438 ($R'_1$), reference block 440 ($R_0$), and reference block 442 ($R'_0$).

At the encoder side (e.g., video encoder 200), the decision on whether to use FRUC merge mode for a CU is based on RD (rate-distortion) cost selection as done for normal merge candidates. That is, the two matching modes (bilateral matching and template matching) are both checked for a CU by using RD cost selection. The mode leading to the minimal cost is further compared to other CU modes. If a FRUC matching mode is the most efficient one, FRUC flag is set to true for the CU and the related matching mode is used.

Figure 7:
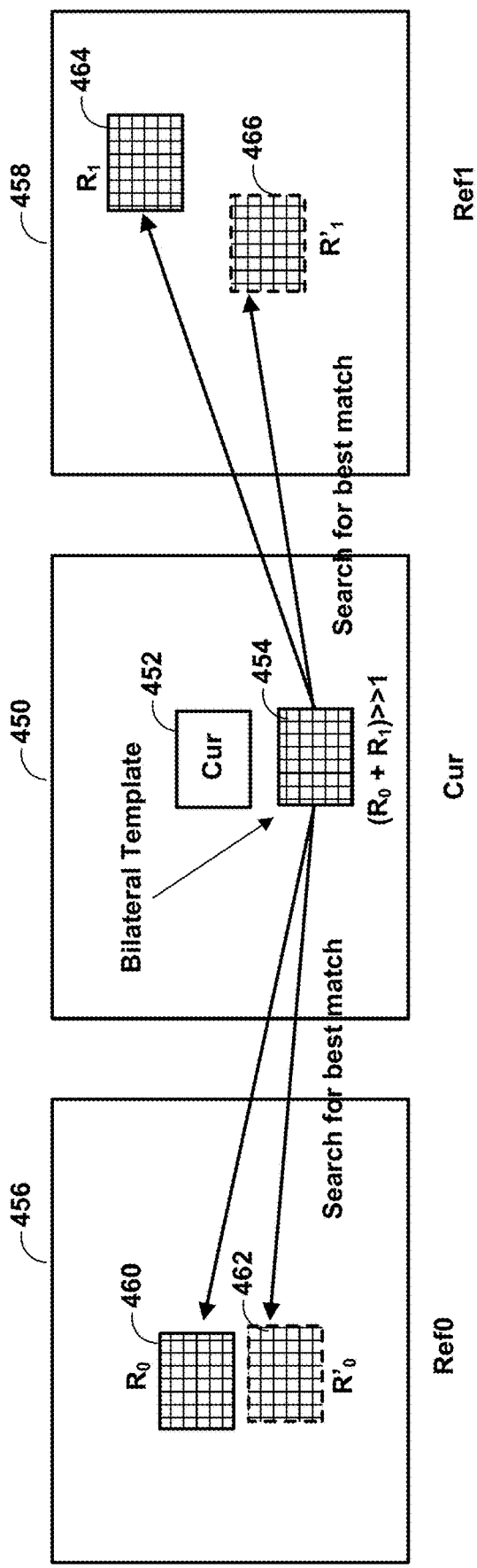
FIG. 7 is a conceptual diagram illustrating decoder-side motion vector derivation based on bilateral template matching.

Bilateral template matching will now be discussed. FIG. 7 shows an example of bilateral template matching. When performing bilateral template matching, video decoder 300 may be configured to generate a bilateral template 454 for current block 452 in current picture 450. Bilateral template 454 is the weighted combination (e.g., ($R_0+R_1$)>>1) of the two prediction blocks, from the initial MV0 of list0 and MV1 of list1, respectively, as shown in FIG. 7. For example, the two prediction blocks may be block 460 ($R_0$) in picture 456 (Ref0) and block 464 ($R_1$) in picture 458 (Ref1). In another example, the two prediction blocks may be block 462 ($R'_0$) in picture 456 (Ref0) and block 466 ($R'_1$) in picture 458 (Ref1).

The template matching operation includes calculating cost measures between the generated template and the sample region (around the initial prediction block) in the reference picture. For each of the two reference pictures, the MV that yields the minimum template cost is considered as the updated MV of that list to replace the original one. Finally, the two new MVs, i.e., MV0' and MV1' are used for regular bi-prediction. As it is commonly used in block-matching motion estimation, the sum of absolute differences (SAD) may be utilized as cost measure.

The proposed decoder-side motion vector derivation (DMVD) techniques are applied for merge mode of bi-prediction with one from the reference picture in the past and the other from reference picture in the future, without the transmission of additional syntax element.

In JEM4.0, when local illumination compensation (LIC), affine, sub-CU merge candidate or FRUC is selected for one CU, DMVD is not applied.

In DMVD related methods, such as FRUC bilateral matching and template matching, the MVs can be derived on the decoder side, and therefore no signaling is required for the motion information. However, the derivation process increases the complexity in the decoder (e.g., in video decoder 300). This disclosure describes several techniques to address the complexity issue in the decoder for DMVD methods.

The techniques of this disclosure are elaborated in several different itemized examples, as listed below. The following techniques to improve the coding efficiency of DMVD and/or to reduce the complexity of implementing DMVD in a video decoder may be applied individually. Alternatively, any combination of the following techniques may be used together. A first example technique addresses some limitations of FRUC, which uses the reconstructed pixels as the template. In the other examples, this disclosure describes other motion derivation methods using the MVs in spatial and temporal neighboring PUs, which avoids the costly search process in FRUC template matching.

Derive FRUC Template by Prediction Pixel Values

In a first example of the disclosure, instead of using reconstructed pixel as a template for DMVD (e.g., FRUC), video encoder 200 and video decoder 300 may be configured to derive a DMVD template by using prediction pixel values (e.g., the pixel values of the predictive block). In this example, the derivation of the template does not depend on residual information, so the complexity of a decoder implementation of video decoder 300 can be reduced.

In one example of this technique, after video decoder 300 performs intra/inter-prediction and gets the prediction pixel values of the neighboring pixels, video decoder 300 can use the prediction pixel values to derive a DMVD template (e.g., a FRUC template) and perform template matching (e.g., FRUC template matching).

In more detail, video decoder 300 may first perform a prediction process for one or more neighboring blocks of video data that are neighboring a current block of video data to obtain prediction pixel values for neighboring pixels of the current block of video data. The prediction process may be inter prediction, intra prediction, or any other predictive coding technique. Video decoder 300 may then be configured to derive a template (e.g., a template for DMVD) for the current block of video data using the prediction pixel values. Video decoder 300 may then perform a decoder-side motion vector derivation technique using the derived template to derive a motion vector for the current block of video data, and decode the current block of video data using the derived motion vector.

The above techniques may be used for any DMVD technique that uses a template to derive a motion vector. In one example, the template is a frame rate up conversion (FRUC) template, and the decoder-side motion vector derivation technique is FRUC template matching. In another example, the decoder-side motion vector derivation technique is bilateral template matching. In another example, the decoder-side motion vector derivation technique is pattern matched motion vector derivation.

In some examples, the techniques for deriving the template may depend on the coding mode of the neighboring CUs. The template can be the same as the prediction results (e.g., prediction results from intra-prediction or inter-prediction). If the neighboring pixels are in a CU coded with inter prediction, video decoder 300 may be configured to perform simplified inter-prediction first and use the prediction results to derive the FRUC template. In one example, the simplified inter-prediction can be inter-prediction without bi-directional optical flow (BIO). In another example, the simplified inter-prediction can be inter-prediction with integer motion.

If the neighboring pixels are coded by an intra-predicted CU, video decoder 300 may be configured to exclude those pixels from the template because the intra-prediction results may not be reliable. In another example, when video decoder 300 performs FRUC template matching, video decoder 300 may apply lower weight values to calculate the sum of absolute differences (SAD) for those pixels coded by an intra-predicted CU.

Derive MV from Neighboring Motion Vectors

Figure 8:
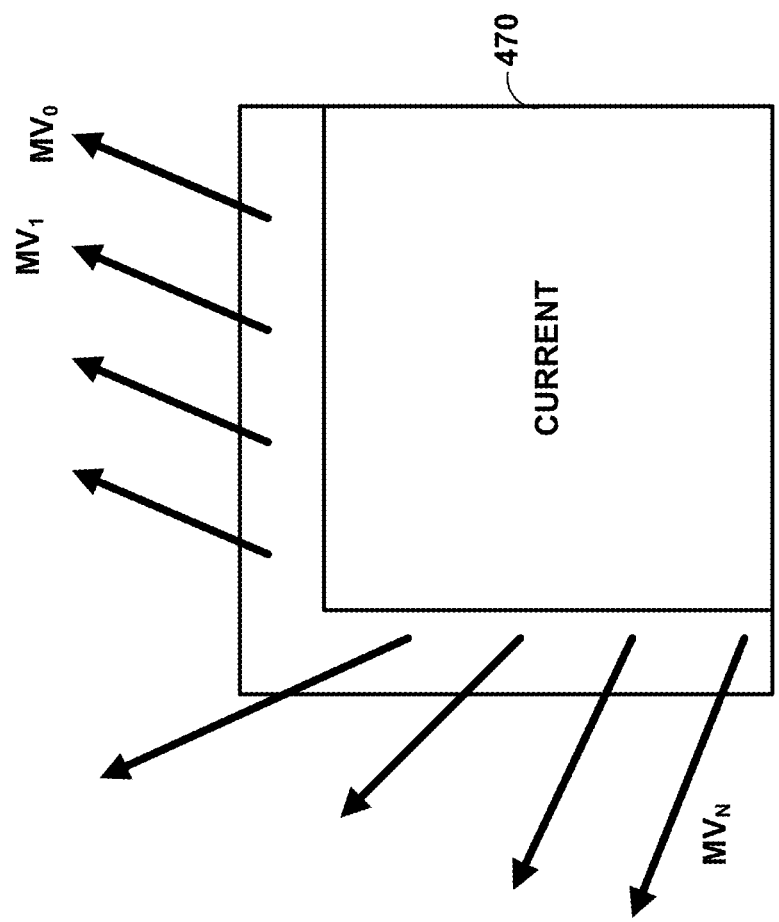
FIG. 8 is a conceptual diagram illustrating neighboring motion vectors of a current block.

In another example of the disclosure, video decoder 300 may be configured to derive a motion vector for the current block from its neighboring motion vectors. As shown in FIG. 8, video decoder 300 may be configured to derive a MV for the current block 470 as weighted average of all neighboring MVs:

$$MV_{curr} = \sum_{i=0} w_i \cdot MV_i$$

Video decoder 300 ma be configured to use one or more settings for weight values $w_i$. In one example, and the setting for the weights is explicitly signaled from video encoder 200 to video decoder 300, or implicitly derived/defined by video decoder 300.

In some examples, special weight values could be applied. One example could be that the weight values of the MVs on the corner positions (e.g., $MV_0$ and $MV_N$ in FIG. 8) could be larger than other MVs. The weight values could depend on the current block size. If one of neighboring MVs is far away from other neighboring MVs, a special weight value can be applied to this MV.

In another example, video decoder 300 may be configured to derive the MV for current block 470 as the weighted average of the corner MVs. The corner MVs could be a subset of the MVs of the spatial neighbor blocks located at the top-left, top-right, and bottom-left corners of the current block.

In yet another example, current block 470 is divided into sub-blocks. Video decoder 300 may be configured to derive a motion vector for each sub-block from the current block's neighboring motion vectors. Video decoder 300 may be configured to derive a MV for each sub-block as a weighted average of all neighboring MVs. There could be one or more setting of weight values for each sub-block, and the setting may be explicitly signaled from video encoder 200 to video decoder 300, or implicitly derived/defined by video decoder 300.

Derive MV from MVs on Collocated Picture

Figure 9:
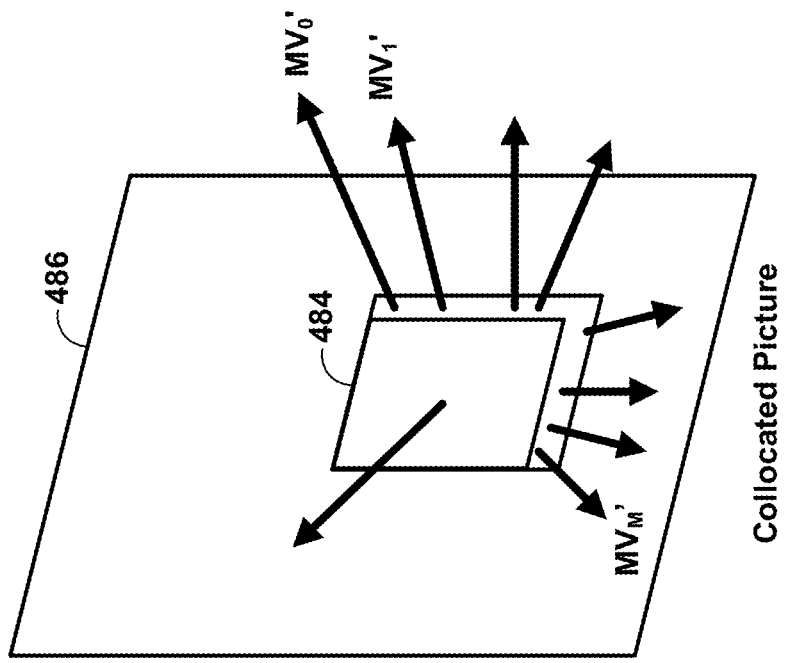
FIG. 9 is a conceptual diagram illustrating motion vectors and neighboring motion vectors of a collocated block.
Figure 9:
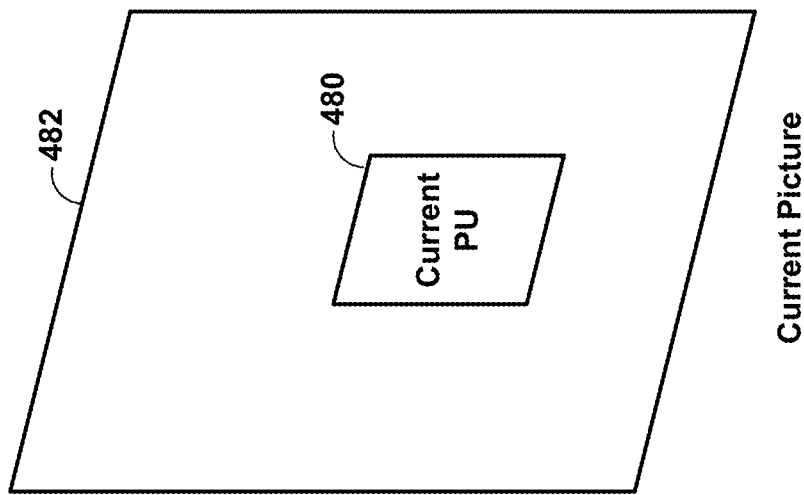

In one example, video decoder 300 may be configured to derive a motion vector for current block 480 (current PU) in current picture 482 from collocated block 484 (PU) in collocated picture 486, as shown in FIG. 9. Video decoder 300 may be configured to derive a MV for current block 480 (or the MVs of its sub-block(s)) as a weighted average of the MVs of collocated PU 484 as follows:

$$MV_{curr} = \sum_{i=0} w'_i \cdot MV'_i + w_{col} \cdot MV_{col}$$

where $MV_{col}$ is the motion vector of collocated block 484 in collocated picture 486 of current block 480 and $MV_i'$ are the motion vectors in collocated picture 486. Like the above examples, there may be one or more settings for the weight values $w_i'$, which can be explicitly signaled from video encoder 200 to video decoder 300, or implicitly derived/defined by video decoder 300. In some examples, special weight values could be applied. Besides the aforementioned examples above, another example could be that the weight value of the MV of the collocated motion vector is larger than that of the neighboring MVs.

The techniques in this section can also be combined with the spatial neighboring MVs above, i.e., video decoder 300 may be configured to derive the MV for the current block as the weighted average of spatial neighboring MVs and MVs on the collocated picture, as follows:

$$MV_{curr} = \sum_{i=0} w_i \cdot MV_i + \sum_{j=0} w'_j \cdot MV'_j + w_{col} \cdot MV_{col}$$

Figure 10:
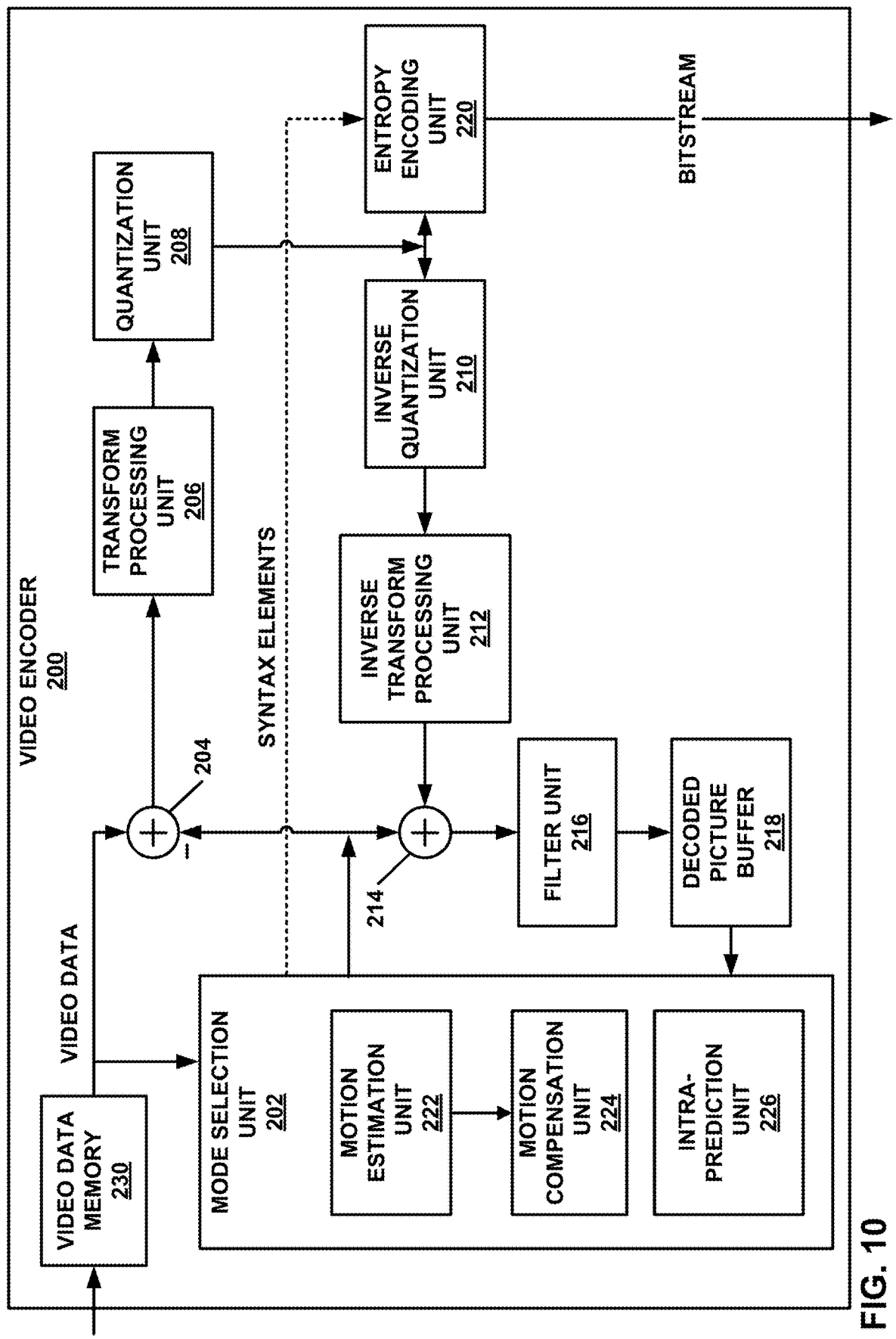
FIG. 10 is a block diagram illustrating an example video encoder that may perform the techniques of this disclosure.

FIG. 10 is a block diagram illustrating an example video encoder 200 that may perform the techniques of this disclosure. FIG. 10 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.66 video coding standard in development. However, the techniques of this disclosure are not limited to these video coding standards, and are applicable generally to video encoding and decoding.

In the example of FIG. 10, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 10 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to derive a frame rate up conversion (FRUC) template using prediction pixel value and perform a decoder-side motion vector derivation technique using the derived template. In another example, video decoder 300 may be configured to determine respective motion vectors from one or more neighboring blocks of video data and derive a motion vector for a current block of video data using the respective motion vectors from the one or more neighboring blocks of video data. In another example, video decoder 300 may be configured to determine respective motion vectors from one or more collocated blocks of video data, and derive a motion vector for a current block of video data using the respective motion vectors from the one or more collocated blocks of video data.

Figure 11:
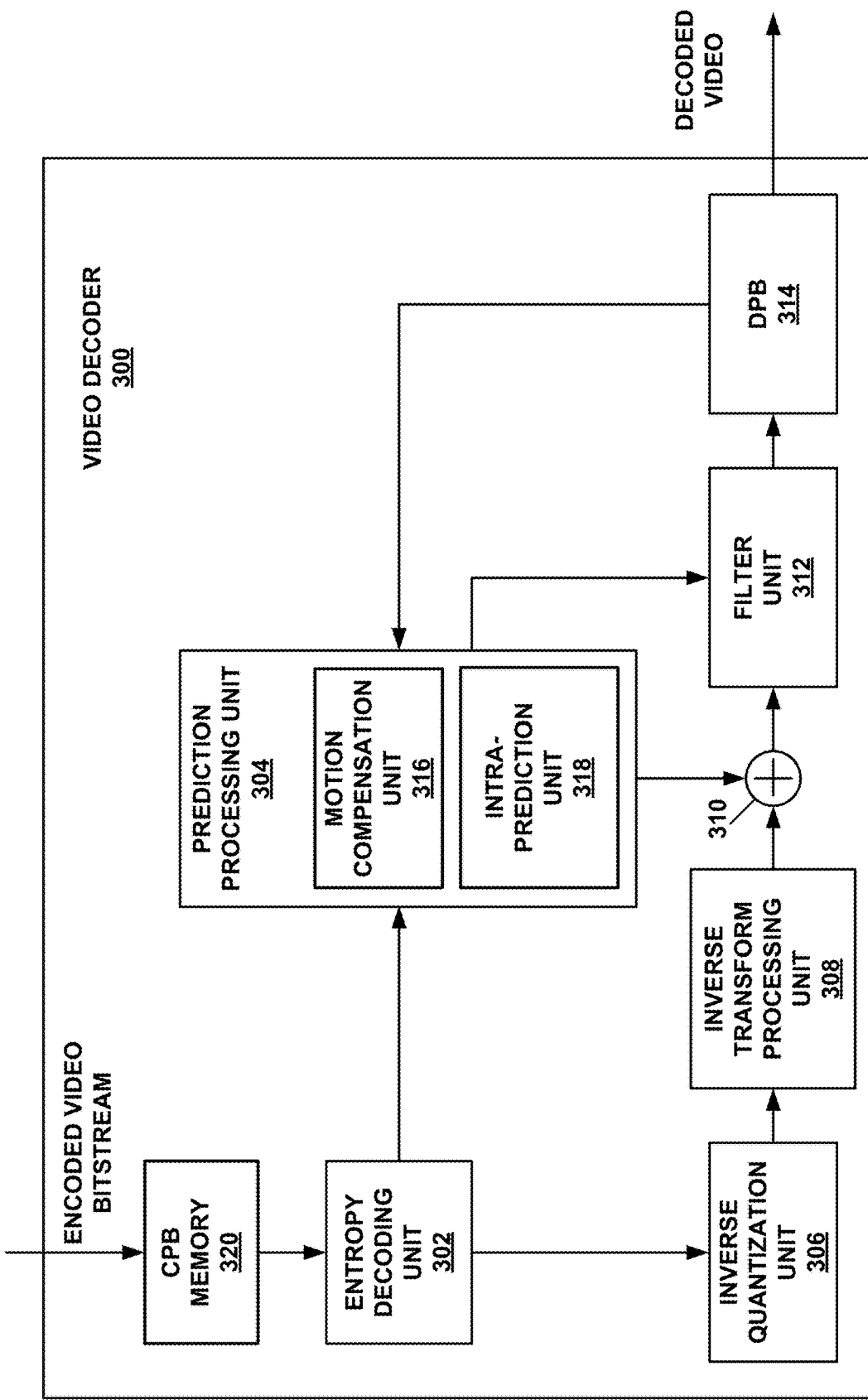
FIG. 11 is a block diagram illustrating an example video decoder that may perform the techniques of this disclosure.

FIG. 11 is a block diagram illustrating an example video decoder 300 that may perform the techniques of this disclosure. FIG. 11 is provided for purposes of explanation and is not limiting on the techniques as broadly exemplified and described in this disclosure. For purposes of explanation, this disclosure describes video decoder 300 is described according to the techniques of JEM, H.266/VVC, and HEVC. However, the techniques of this disclosure may be performed by video coding devices that are configured to other video coding standards.

In the example of FIG. 11, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 11 are illustrated to assist with understanding the operations performed by video decoder 300. The units may be implemented as fixed-function circuits, programmable circuits, or a combination thereof. Similar to FIG. 10, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 10).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 10). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to perform a prediction process for one or more neighboring blocks of video data that are neighboring a current block of video data to obtain prediction pixel values for neighboring pixels of the current block of video data, derive a template for the current block of video data using the prediction pixel values, perform a decoder-side motion vector derivation technique using the derived template to derive a motion vector for the current block of video data, and decode the current block of video data using the derived motion vector.

Figure 12:
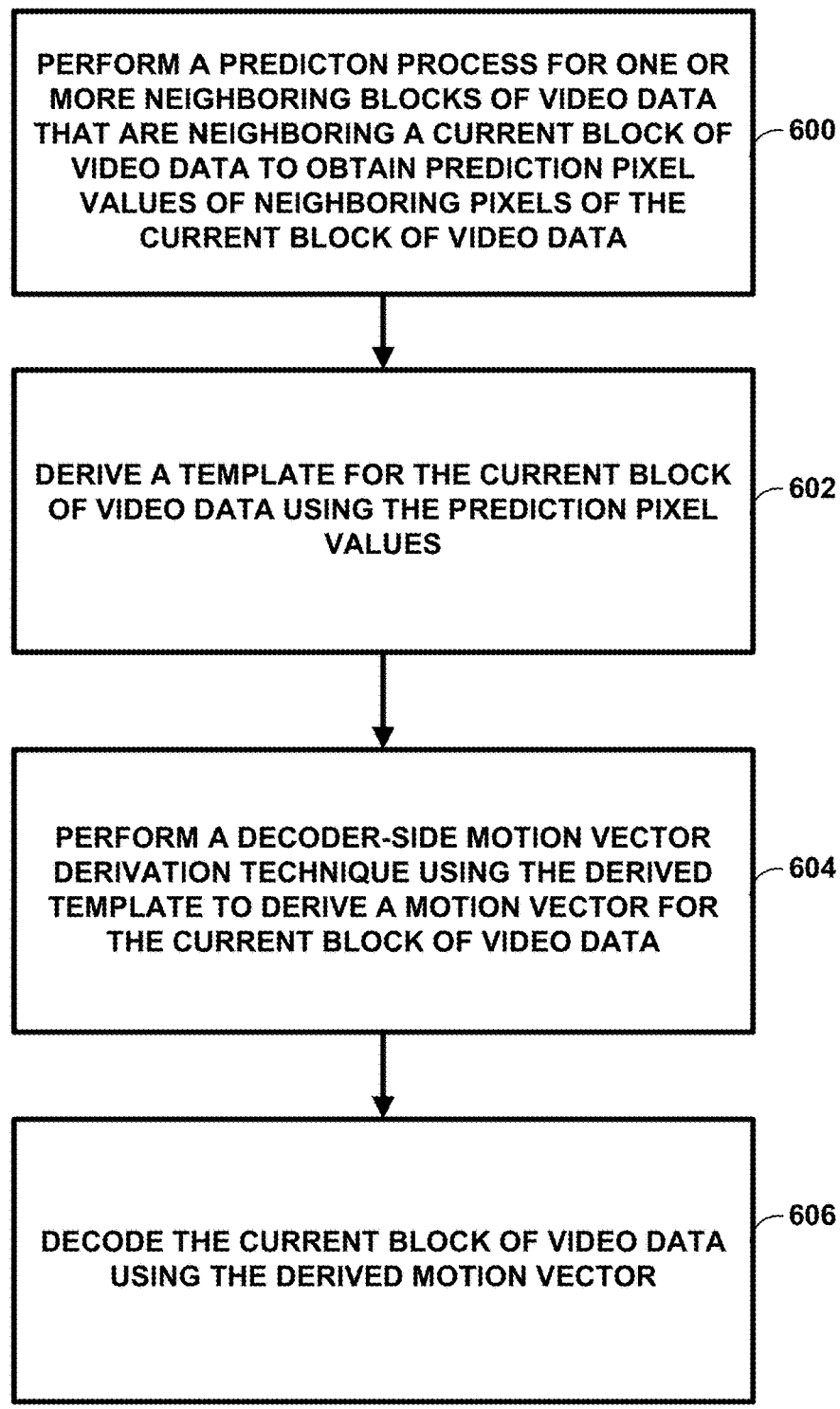
FIG. 12 is a flowchart showing an example operation of a video decoder according to the techniques of this disclosure.

FIG. 12 is a flowchart showing an example operation of a video decoder according to the techniques of this disclosure. One or more structural components of video decoder 300, including motion compensation unit 316, may be configured to perform the techniques of FIG. 12.

In one example of the disclosure, video decoder 300 may be configured to perform a prediction process for one or more neighboring blocks of video data that are neighboring a current block of video data to obtain prediction pixel values for neighboring pixels of the current block of video data (600), derive a template for the current block of video data using the prediction pixel values (602), and perform a decoder-side motion vector derivation technique using the derived template to derive a motion vector for the current block of video data (604). Video decoder 300 may be further configured to decode the current block of video data using the derived motion vector (606). In one example, the prediction process is intra prediction or inter prediction.

In one example, the template is a frame rate up conversion (FRUC) template, and the decoder-side motion vector derivation technique is FRUC template matching. In another example, the decoder-side motion vector derivation technique is bilateral template matching. In another example, the decoder-side motion vector derivation technique is pattern matched motion vector derivation.

In another example of the disclosure, to derive the template for the current block of video data using the prediction pixel values, video decoder 300 is further configured to derive the template for the current block of video data based on the prediction pixel values and the coding mode of the one or more neighboring blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    performing a prediction process for one or more neighboring blocks of video data that are neighboring a current block of video data to obtain prediction pixel values for neighboring pixels of the current block of video data;
    deriving a template for the current block of video data using the prediction pixel values without reconstructing the one or more neighboring blocks of video data;
    deriving the template for the current block of video data based on the prediction pixel values and the coding mode of the one or more neighboring blocks of video data
    performing a decoder-side motion vector derivation technique using the derived template to derive a motion vector for the current block of video data; and
    decoding the current block of video data using the derived motion vector.

2. The method of claim 1, wherein the prediction process is intra prediction or inter prediction.

3. The method of claim 1, wherein the template is a frame rate up conversion (FRUC) template, and the decoder-side motion vector derivation technique is FRUC template matching.

4. The method of claim 1, wherein the decoder-side motion vector derivation technique is bilateral template matching.

5. The method of claim 1, wherein the decoder-side motion vector derivation technique is pattern matched motion vector derivation.

6. The method of claim 1, further comprising:
    outputting the decoded current block of video data for display.

7. An apparatus configured to decode video data, the apparatus comprising:
    a memory configured to store video data; and one or more processors in communication with the memory, the one or more processors configured to:
    perform a prediction process for one or more neighboring blocks of video data that are neighboring a current block of video data to obtain prediction pixel values for neighboring pixels of the current block of video data;
    derive a template for the current block of video data using the prediction pixel values without reconstructing the one or more neighboring blocks of video data;
    derive the template for the current block of video data based on the prediction pixel values and the coding mode of the one or more neighboring blocks of video data;
    perform a decoder-side motion vector derivation technique using the derived template to derive a motion vector for the current block of video data; and
    decode the current block of video data using the derived motion vector.

8. The apparatus of claim 7, wherein the prediction process is intra prediction or inter prediction.

9. The apparatus of claim 7, wherein the template is a frame rate up conversion (FRUC) template, and the decoder-side motion vector derivation technique is FRUC template matching.

10. The apparatus of claim 7, wherein the decoder-side motion vector derivation technique is bilateral template matching.

11. The apparatus of claim 7, wherein the decoder-side motion vector derivation technique is pattern matched motion vector derivation.

12. The apparatus of claim 7, wherein the one or more processors are further configured to:
output the decoded current block of video data for display.

13. The apparatus of claim 12, further comprising:
a display configured to display decoded video data.

14. The apparatus of claim 7, wherein the apparatus comprises one or more of a camera, a computer, a mobile device, a broadcast receiver device, or a set-top box.

15. An apparatus configured to decode video data, the apparatus comprising:
means for performing a prediction process for one or more neighboring blocks of video data that are neighboring a current block of video data to obtain prediction pixel values for neighboring pixels of the current block of video data;
means for deriving a template for the current block of video data using the prediction pixel values without reconstructing the one or more neighboring blocks of video data:
means for deriving the template for the current block of video data based on the prediction pixel values and the coding mode of the one or more neighboring blocks of video data, means for performing a decoder-side motion vector derivation technique using the derived template to derive a motion vector for the current block of video data; and
means for decoding the current block of video data using the derived motion vector.

16. The apparatus of claim 15, wherein the prediction process is intra prediction or inter prediction.

17. The apparatus of claim 15, wherein the decoder-side motion vector derivation technique is pattern matched motion vector derivation.

18. The apparatus of claim 15, wherein the decoder-side motion vector derivation technique is bilateral template matching.

19. The apparatus of claim 15, wherein the template is a frame rate up conversion (FRUC) template, and the decoder-side motion vector derivation technique is FRUC template matching.

20. The apparatus of claim 15, further comprising:
means for outputting the decoded current block of video data for display.

21. A non-transitory computer-readable storage medium storing instructions that, when executed, cause one or more processors to:
perform a prediction process for one or more neighboring blocks of video data that are neighboring a current block of video data to obtain prediction pixel values for neighboring pixels of the current block of video data;
derive a template for the current block of video data using the prediction pixel values without reconstructing the one or more neighboring blocks of video data;
derive the template for the current block of video data based on the prediction pixel values and the coding mode of the one or more neighboring blocks of video data;
perform a decoder-side motion vector derivation technique using the derived template to derive a motion vector for the current block of video data; and
decode the current block of video data using the derived motion vector.

22. The non-transitory computer-readable storage medium of claim 21, wherein the prediction process is intra prediction or inter prediction.

23. The non-transitory computer-readable storage medium of claim 21, wherein the template is a frame rate up conversion (FRUC) template, and the decoder-side motion vector derivation technique is FRUC template matching.

24. The non-transitory computer-readable storage medium of claim 21, wherein the decoder-side motion vector derivation technique is bilateral template matching.

25. The non-transitory computer-readable storage medium of claim 21, wherein the decoder-side motion vector derivation technique is pattern matched motion vector derivation.

26. The non-transitory computer-readable storage medium of claim 21, wherein the instructions further cause the one or more processors to:
output the decoded current block of video data for display.

* * * * *